United States Patent
Fick et al.

(10) Patent No.: US 12,205,016 B2
(45) Date of Patent: *Jan. 21, 2025

(54) SYSTEMS AND METHODS FOR ENHANCING INFERENTIAL ACCURACY OF AN ARTIFICIAL NEURAL NETWORK DURING TRAINING ON A MIXED-SIGNAL INTEGRATED CIRCUIT

(71) Applicant: Mythic, Inc., Austin, TX (US)

(72) Inventors: David Fick, Hutto, TX (US); Daniel Graves, Beaumont (CA); Michael Klachko, Boca Raton, FL (US); Ilya Perminov, Vancouver (CA); John Mark Beardslee, Menlo Park, CA (US); Evgeny Shapiro, Vancouver (CA)

(73) Assignee: Mythic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,424

(22) Filed: Jul. 15, 2023

(65) Prior Publication Data
US 2023/0359874 A1    Nov. 9, 2023

Related U.S. Application Data

(63) Continuation of application No. 17/705,250, filed on Mar. 25, 2022, now Pat. No. 11,720,784.
(Continued)

(51) Int. Cl.
*G06N 3/063* (2023.01)
*G06N 3/08* (2023.01)

(52) U.S. Cl.
CPC ............... *G06N 3/063* (2013.01); *G06N 3/08* (2013.01)

(58) Field of Classification Search
CPC ........ G06N 3/045; G06N 3/048; G06N 3/063; G06N 3/08
See application file for complete search history.

(56) References Cited

U.S. PATENT DOCUMENTS

| | | | |
|---|---|---|---|
| 2006/0195706 A1 | 8/2006 | Burchard et al. | |
| 2008/0089333 A1 | 4/2008 | Kozat et al. | |

(Continued)

OTHER PUBLICATIONS

Xiao et al., "Analog architectures for neural network acceleration based on non-volatile memory", Jul. 9, 2020, Appl. Phys. Rev. 7, 031301, pp. 1-34. (Year: 2020).*

(Continued)

*Primary Examiner* — Brent Johnston Hoover
(74) *Attorney, Agent, or Firm* — Padowithz Alce; Alce PLLC

(57) ABSTRACT

A system and method for enhancing inferential accuracy of an artificial neural network during training includes during a simulated training of an artificial neural network identifying channel feedback values of a plurality of distinct channels of a layer of the artificial neural network based on an input of a training batch; if the channel feedback values do not satisfy a channel signal range threshold, computing a channel equalization factor based on the channel feedback values; identifying a layer feedback value based on the input of the training batch; and if the layer feedback value does not satisfy a layer signal range threshold, identifying a composite scaling factor based on the layer feedback values; during a non-simulated training of the artificial neural network, providing training inputs of: the training batch; the composite scaling factor; the channel equalization factor; and training the artificial neural network based on the training inputs.

17 Claims, 7 Drawing Sheets

Related U.S. Application Data

(60) Provisional application No. 63/230,538, filed on Aug. 6, 2021, provisional application No. 63/175,171, filed on Apr. 15, 2021, provisional application No. 63/169,869, filed on Apr. 1, 2021.

(56) References Cited

U.S. PATENT DOCUMENTS

| | | |
|---|---|---|
| 2020/0090045 A1* | 3/2020 | Baker .................... G06N 3/084 |
| 2020/0234132 A1 | 7/2020 | Tan et al. |
| 2020/0349421 A1 | 11/2020 | Tran et al. |

OTHER PUBLICATIONS

International Application No. PCT/US22/23311, International Search Report and Written Opinion mailed Aug. 2, 2022, 9 pages.

* cited by examiner

```
┌─────────────────────────────────────────────────────────┐
│  Measuring Output Activations Computed by One or More   │
│         Matrix Multiply Accelerators S210               │
└─────────────────────────────────────────────────────────┘

┌ ─ ─ ─ ─ ─ ─ ─ ─ ─ ─ ─ ─ ─ ─ ─ ─ ─ ─ ─ ─ ─ ─ ─ ─ ─ ─ ─ ┐
  Equalizing Output Activations for One or More Target Layers of
│         an Artifical Neural Network S220                │
└ ─ ─ ─ ─ ─ ─ ─ ─ ─ ─ ─ ─ ─ ─ ─ ─ ─ ─ ─ ─ ─ ─ ─ ─ ─ ─ ─ ┘

┌─────────────────────────────────────────────────────────┐
│  Boosting or Scaling Output Activations for One or More Target │
│       Layers of an Artifical Neural Network S230        │
└─────────────────────────────────────────────────────────┘

┌ ─ ─ ─ ─ ─ ─ ─ ─ ─ ─ ─ ─ ─ ─ ─ ─ ─ ─ ─ ─ ─ ─ ─ ─ ─ ─ ─ ┐
  Validating each Layer-Specific Composite Scaling Factor and/or
│     each Channel-Specific Adjustment Factor S240        │
└ ─ ─ ─ ─ ─ ─ ─ ─ ─ ─ ─ ─ ─ ─ ─ ─ ─ ─ ─ ─ ─ ─ ─ ─ ─ ─ ─ ┘

┌─────────────────────────────────────────────────────────┐
│   Encoding the One or More Matrix Multiply Accelerators S250   │
└─────────────────────────────────────────────────────────┘

┌ ─ ─ ─ ─ ─ ─ ─ ─ ─ ─ ─ ─ ─ ─ ─ ─ ─ ─ ─ ─ ─ ─ ─ ─ ─ ─ ─ ┐
│         Computing a Digital Scaling Factor S255         │
└ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIGURE 2

SYSTEMS AND METHODS FOR ENHANCING INFERENTIAL ACCURACY OF AN ARTIFICIAL NEURAL NETWORK DURING TRAINING ON A MIXED-SIGNAL INTEGRATED CIRCUIT

CROSS-REFERENCE TO RELATED APPLICATIONS

This application is a continuation of U.S. patent application Ser. No. 17/705,250, filed 25 Mar. 2022, which claims the benefit of U.S. Provisional Application No. 63/169,869, filed 1 Apr. 2021, U.S. Provisional Application No. 63/175,171, filed 15 Apr. 2021, and U.S. Provisional Application No. 63/230,538, filed 6 Aug. 2021, which are incorporated in their entireties by this reference.

TECHNICAL FIELD

The inventions described herein relate generally to the integrated circuitry architecture field, and more specifically to new and useful intelligent integrated circuits and methods of computing with the intelligent integrated circuit in the integrated circuitry architecture field.

BACKGROUND

Today, the various implementations of artificial intelligence and machine learning are driving innovation in many fields of technology. Artificial intelligence (AI) systems and artificial intelligence models (including algorithms) are defined by many system architectures and models that enable machine learning (deep learning), reasoning, inferential capacities, and large data processing capabilities of a machine (e.g., a computer and/or a computing server). These AI systems and models are often trained intensively to perform one or more specific tasks, such as natural language processing, image recognition, planning, decision-making, and the like. For example, a subset of these AI systems and models includes artificial neural network models. The training of an artificial neural network model may, in many cases, require thousands of hours across the training cycle and many terabytes of training data to fine tune associated neural network algorithm(s) of the model before use.

However, once trained, a neural network model or algorithm may be deployed quickly to make inferences to accomplish specific tasks (e.g., recognizing speech from speech input data, etc.) based on relatively smaller datasets when compared to the larger training datasets used during the training cycle. The inferences made by the neural network model or algorithm based on the smaller datasets may be a prediction about what the neural network model calculates to be a correct answer or indication about a circumstance.

Still, while neural network models implementing one or more neural network algorithms may not require a same amount of compute resources, as required in a training phase, deploying a neural network model in the field continues to require significant circuitry area, energy, and compute power to classify data and infer or predict a result. For example, weighted sum calculations are commonly used in pattern matching and machine learning applications, including neural network applications. In weighted sum calculations, an integrated circuit may function to multiply a set of inputs ($x_i$) by a set of weights ($w_i$) and sum the results of each multiplication operation to calculate a final result (z). Typical weighted sum calculations for a machine learning application, however, include hundreds or thousands of weights which causes the weighted sum calculations to be computationally expensive to compute with traditional digital circuitry. Specifically, accessing the hundreds or thousands of weights from a digital memory requires significant computing time (i.e., increased latency) and significant energy.

Accordingly, traditional digital circuitry required for computing weighted sum computations of a neural network model or the like tend to be large to accommodate a great amount of digital memory circuitry needed for storing the millions of weights required for the neural network model. Due to the large size of the circuitry, more energy is required to enable the compute power of the many traditional computers and circuits.

Additionally, these traditional computers and circuits for implementing artificial intelligence models and, namely, neural network models may be suitable for remote computing processes, such as in distributed computing systems (e.g., the cloud), or when using many onsite computing servers and the like. However, latency problems are manifest when these remote artificial intelligence processing systems are used in computing inferences and the like for remote, edge computing devices or in field devices. That is, when these traditional remote systems seek to implement a neural network model for generating inferences to be used in remote field devices, there are unavoidable delays in receiving input data from the remote field devices because the input data must often be transmitted over a network with varying bandwidth and subsequently, inferences generated by the remote computing system must be transmitted back to the remote field devices via a same or similar network. Additionally, these traditional circuit often cannot manage the computing load (e.g., limited storage and/or limited compute) and may often rely on remote computing systems, such as the cloud, to perform computationally-intensive computations and store the computation data (e.g., raw inputs and outputs). Thus, constant and/or continuous access (e.g., 24×7 access) to the remote computing systems (e.g., the cloud) is required for continuous operation, which may not be suitable in many applications either due to costs, infrastructure limitations (e.g., limited bandwidth, low grade communication systems, etc.), and the like.

Implementing AI processing systems at the field level (e.g., locally at the remote field device) may be a proposed solution to resolve some of the latency issues. However, attempts to implement some of these traditional AI computers and systems at an edge device (e.g., remote field device) may result in a bulky system with many circuits, as mentioned above, that consumes significant amounts of energy due to the required complex architecture of the computing system used in processing data and generating inferences. Thus, such a proposal without more may not be feasible and/or sustainable with current technology.

Accordingly, there is a need for a deployable system for implementing artificial intelligence models locally in the field (e.g., local AI), and preferably to be used in edge devices, that do not result in large, bulky (edge) devices, that reduces latency, and that have necessary compute power to make predictions or inferences, in real-time or substantially real-time, while also being energy efficient.

The below-described embodiments of the present application provide such advanced and improved integrated circuits and implementation techniques capable of addressing the deficiencies of traditional systems and integrated circuit architectures for implementing AI and machine learning.

BRIEF SUMMARY OF THE INVENTION(S)

In one embodiment, a method for enhancing inferential accuracy of an artificial neural network during training on a mixed-signal integrated circuit includes at a simulated training stage: (i) measuring an activation output signal range of each of a plurality of distinct channels of a computational layer of a target artificial neural network based on an input of a batch of training data for training the target artificial neural network; (ii) identifying a distinct channel equalization factor for each of the plurality of distinct channels based on the activation output signal range of each of the plurality of distinct channels; (iii) measuring activation output signal ranges of a computational layer of an artificial neural network based on the input of the batch of training data; and (iv) identifying a dynamic composite scaling factor based on the measurement of activation output signal ranges of the computational layer; at a non-simulated training stage, providing training inputs of: (a) the batch of training data; (b) the dynamic composite scaling factor; (c) the distinct channel equalization factor for each of the plurality of distinct channels; and training the artificial neural network based on the training inputs.

In one embodiment, identifying the channel equalization factor for each of the plurality of distinct channels includes: setting a channel equalization target based on identifying a dominant channel of the plurality of distinct channels of the computational layer, wherein the channel equalization target comprises an upper limit of the activation output signal range of the dominant channel, wherein the dominant channel relates to a channel within the computational layer having an activation output signal range that is highest within the computational layer.

In one embodiment, identifying the channel equalization factor for each of the plurality of distinct channels further includes: identifying a distinct signal difference for each of the plurality of distinct channels that includes calculating a difference between the channel equalization target and an upper limit of an activation output signal range of each of the plurality of distinct channels; and calculating the channel equalization factor for each of the plurality of distinct channels based on the distinct signal difference for each of the plurality of distinct channels.

In one embodiment, identifying the dynamic composite scaling factor includes: identifying an activation output signal range having a highest upper limit within the computational layer based on an assessment of the measurement of activation output signal ranges of the computational layer.

In one embodiment, identifying the dynamic composite scaling factor further includes: deriving a composite scaling factor search value based on a quotient of the activation output signal range having the highest upper limit over a maximum channel activation output, performing a search of a plurality of distinct scaling factor parameters using the composite scaling factor search value, and defining the dynamic composite scaling factor based on the plurality of distinct scaling factor parameters.

In one embodiment, the dynamic composite scaling factor relates to automated control that, when executed, increases one or more activation output signal ranges of the computational layer to a statistically maximum activation output signal range.

In one embodiment, the dynamic composite scaling factor, when executed during a training operation, increases an activation output signal range of all the plurality of distinct channels from a first signal range maximum set comprising the channel equalization target to a second signal range comprising a statistically computed maximum activation output signal range of the computational layer.

In one embodiment, at the non-simulated training stage, in sequence: applying the channel equalization factor for each of the plurality of distinct channels during an execution of training operation, and applying the dynamic composite scaling factor to the computational layer during the execution of the training operation.

In one embodiment, the method includes configuring training settings of an accelerator circuit based on the dynamic composite scaling factor for the computational layer and the channel equalization factor for each of the plurality of distinct channels of the computational layer.

In one embodiment, the method includes dynamically encoding one or more circuits operating at the at the non-simulated training stage based on the dynamic composite scaling factor and the channel equalization factor for each of the plurality of distinct channels.

In one embodiment, the method includes identifying the channel equalization factor for each of a plurality of distinct channels of a target computational layer and the dynamic composite scaling factor for the target computational layer on a per-training batch basis.

In one embodiment, the simulated training stage includes a simulation of a hardware architecture of an accelerator circuit of the mixed-signal integrated circuit.

In one embodiment, the activation output signal range of the computational layer of the artificial neural network includes a compilation of an activation output signal range of each of the plurality of distinct channels within the computational layer.

In one embodiment, measuring the activation output signal range of each of the plurality of distinct channels includes: using a statistical calculation to identify and set an upper limit of the activation output signal range of each of the plurality of distinct channels.

In one embodiment, a method for enhancing inferential accuracy of an artificial neural network during training includes during a simulated training of an artificial neural network: (i) identifying channel feedback values of a plurality of distinct channels of a layer of the artificial neural network based on an input of a batch of training data; (ii) if the channel feedback values do not satisfy a channel signal range threshold, computing a channel equalization factor for each of a plurality of distinct channels based on the channel feedback values; (iii) identifying a layer feedback value based on the input of the batch of training data; and (iv) if the layer feedback value does not satisfy a layer signal range threshold, identifying a composite scaling factor based on the layer feedback values; during a non-simulated training of the artificial neural network, providing training inputs of: (a) the batch of training data; (b) the composite scaling factor; (c) the channel equalization factor for each of the plurality of distinct channels; and training the artificial neural network based on the training inputs.

In one embodiment, the channel equalization factor, when executed during the non-simulated training, increases a channel signal range of a subject channel of the plurality of distinct channels of the layer to a target channel signal range value that is set commonly for all the plurality of distinct channels.

In one embodiment, the composite scaling factor, when executed during the non-simulated training, increases a layer signal range of the layer from a first signal range maximum comprising a target channel signal range value that is set commonly for all the plurality of distinct channels to a second signal range comprising a statistically computed maximum layer signal range of the layer.

BRIEF DESCRIPTION OF THE FIGURES

FIG. 2 illustrates an example method in accordance with one or more embodiments of the present application;

DESCRIPTION OF THE PREFERRED EMBODIMENTS

Figure 1:
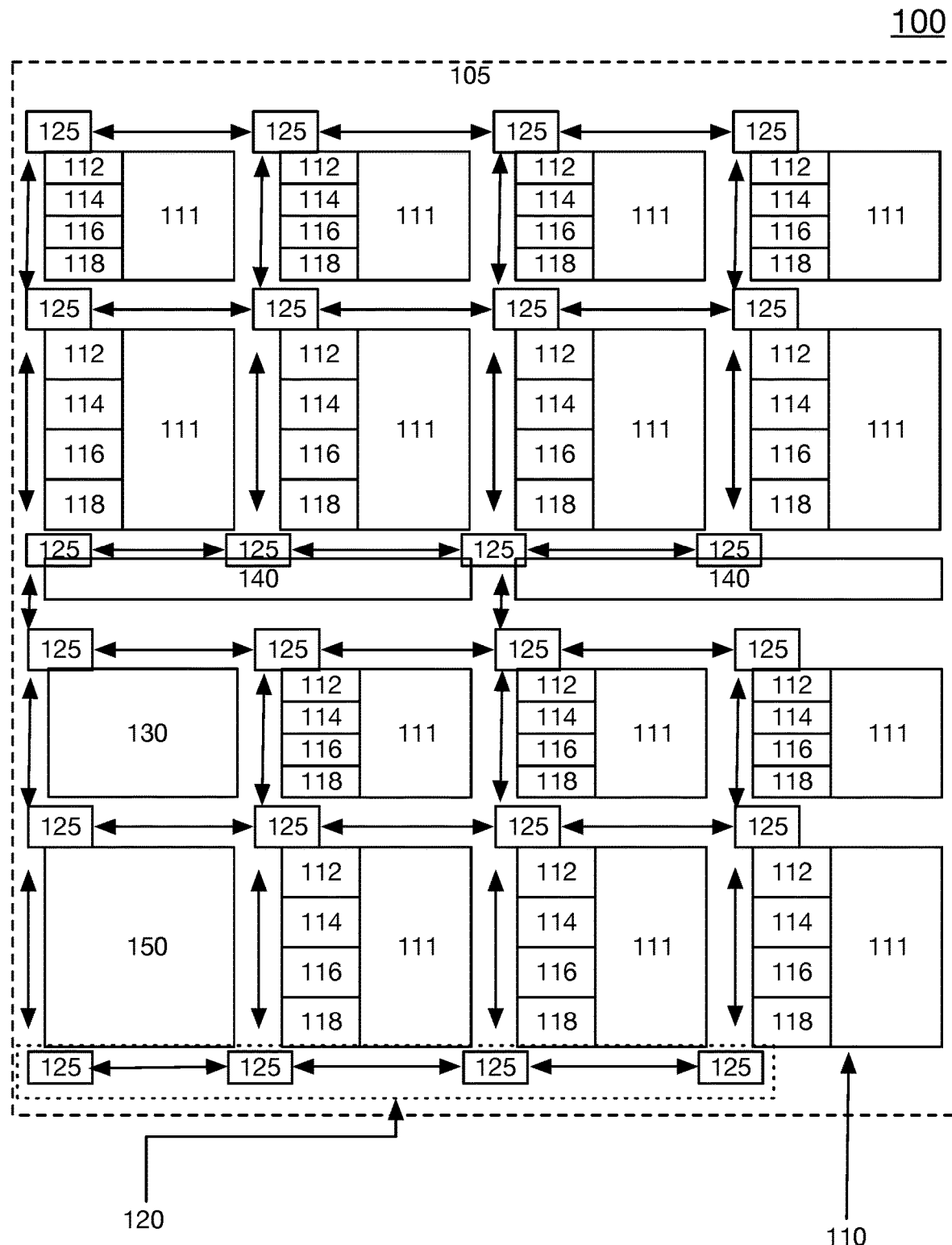
FIGS. 1-1A illustrates a schematic of an intelligence integrated circuit 100 in accordance with one or more embodiments of the present application.

The following description of preferred embodiments of the present application are not intended to limit the inventions to these preferred embodiments, but rather to enable any person skilled in the art of to make and use these inventions.

1. Intelligence Processing Overview

Embodiments of the present application provide a flexible and reprogrammable system that can be programmed to accommodate various computationally-intensive applications or programs of varying complexity and size. While a physical configuration of an integrated circuit architecture according to one or more embodiments of the present application may remain the same or substantially the same, disparate processing elements within the architecture may be programmed to handle multiple applications or one or more sections of a single application.

Further, an implementation and particular arrangement of the storage devices implemented within one or more embodiments of the present application provide several technical benefits over state-of-the-art integrated circuits, including reducing a total requirement of memory or storage required for handling data-intensive applications or programs. For instance, in one embodiment, a distributed memory may include a main (large) buffer may be provided to receive input data (e.g., raw input data or data from an upstream layer or source) and each of a plurality of disparate local buffers may be arranged together with a computing element (e.g., a matrix multiply accelerator) in. In such embodiment, each local buffer may be arranged adjacent to or in an immediate vicinity of the computing element for fast access and therefore, efficient processing of input data from the main buffer.

Additionally, such an arrangement may allow for asynchronous processing of data along a data processing pipeline thereby enabling multiple segments of data to be processed at a same time and possibly in different stages along the pipeline. That is, in some embodiments, the asynchronous processing of data by the one or more components of the integrated circuit may enable a processing of a plurality of distinct sets of data that may not be in perfect lockstep while enabling simultaneous and/or parallel workflows along distinct components of a data processing pipeline. Such embodiments, the requirement for duplication of data may be significantly reduced.

Additionally, one or more embodiments of the present application may function to implement a token-driven data processing system in which a central process control may not be required.

Specifically, in one or more embodiments, an integrated circuit of the present application may include an architecture that may trigger microprocessor (e.g., a nano-processor which may include a microcontroller that may be local to each compute tile of an integrated circuit) programs and/or applications using tokens. A token as referred to herein preferably relate to a piece of data that evidences or represents an occurrence or an existence of a computing event or transaction and may, additionally or alternatively, evidence or represent a state of one or more components of an integrated circuit. In a non-limiting example, in the circumstances in which a token represents a state of an integrated circuit component, the token may indicate whether a buffer is empty or full, occupied or unoccupied, whether a processor is On or Off, busy (processing) or not busy (not processing), whether an item is processed or unprocessed, and/or the like. While, in many embodiments described herein, the tokens may be used for automatically triggering an execution and/or implementation of programs or applications, in various implementations the tokens may be used to trigger other units. A few examples include, using a combination of one or more instances or one or more tokens may indicate that an action or transaction of an integrated circuit has permission to proceed; possibly, meaning that all the dependent actions of the action or transaction have occurred. Thus, the tokens may be used to trigger finite state machines, trigger a release of a packet or a work-queue item, trigger the generation of another token, and/or the like. There may be limitless applications of the token-based governance module (sometimes referred to herein as the flow scoreboard module), described in several of the embodiments, for automatically triggering any type and/or any number of functions/operations with the integrated circuit.

In a preferred embodiment of the present application, the integrated circuit architecture may include a network-on-chip system that enables a communication and/or passing of tokens between distinct components of the integrated circuit. Accordingly, in some embodiments, the tokens may represent pieces of dependencies that enable components of the integrated circuit to receive new workloads triggered by an appropriate combination and/or count of one or more tokens. However, it shall be noted that any suitable token communication scheme and/or interconnect may be used including, but not limited to, serial communication buses or the like. For instance, in one embodiment of the present application, a token may not be released and/or generated (irrespective of an interconnect) until an associated triggering event is completed (e.g., an emptying of a local data buffer, a computation by an MMA or the like against input data, and/or any suitable event). In yet another embodiment, a token may be generated and/or released in advance of an associated triggering event if the early release of the token would not cause ordering constraints to be violated. Accordingly, in several of the embodiments of the present application, it shall be noted that the tokens can be deployed in any suitable manner to achieve a token-based control of the flow of data and/or the processing of data throughout an integrated circuit.

Additionally, the token-based governance module described herein may generally function to enable a token-based control by tracking tokens and token triggering conditions and the like. The token-based governance module may have configurable constraints so that triggering may also depend on a state of a local unit or circuit and not only based on a number of tokens identified or received. That is, in several embodiments of the present application, data flow, data processing, one or more operations/functions and the like may be governed based on the release or generation of tokens, it shall be noted that simply determining and/or identifying a state of a component of the integrated circuit and/or identifying a state of a process or operation within the integrated circuit may serve as a triggering event for yet automating another operation, function, process, or flow. For instance, a state of the utilization (e.g., depth) and/or capacity of one or more work queues may function as a triggering event. A technical benefit of such embodiments may be that an operation may only run when computing resources (e.g., space with the one or more work queues) that may be required are available. Accordingly, the embodiments of the present application may provide a flexibility in how events and/or dependencies are configured that trigger an automated operation, function, or process and therefore, allow for the generation of more complex programs or applications that use greater resources or resources more efficiently, which improves an operating efficiency of the one or more systems described herein by reducing a number of events that need to be generated in order to perform some action.

It shall be noted that, in some embodiments, various and/or different tokens may be implemented by a token-based data processing integrated circuit, as described in more detail as in U.S. Pat. No. 10,606,797, which is incorporated herein in its entirety by this reference. In some embodiments, a triggering condition for performing an action within the integrated circuit may be achieved by a minimum number of counts of each of several distinct token types.

2. Intelligence Processing Computing Architecture

Figure 1A:
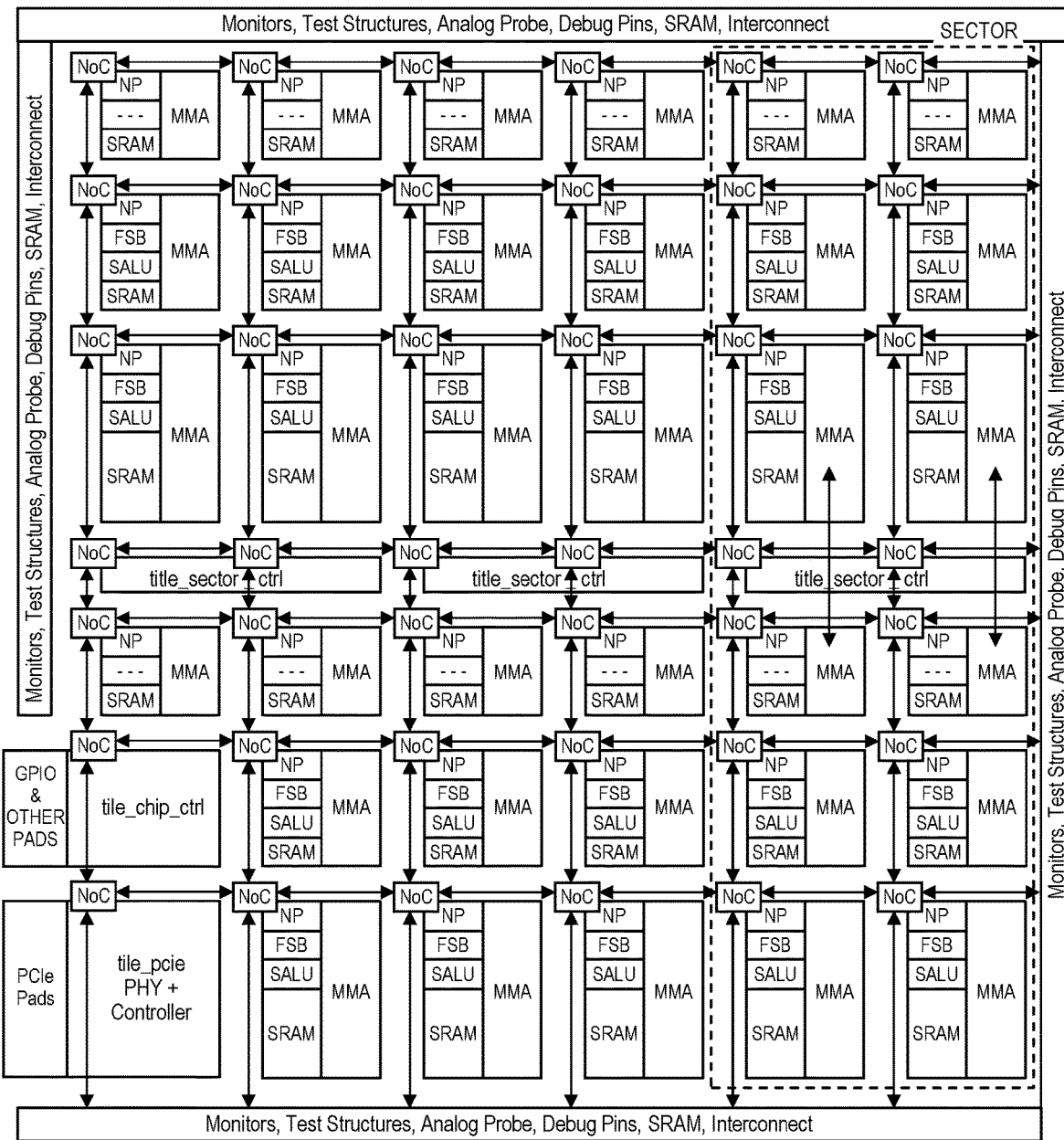

As shown in FIGS. 1-1A, an intelligence processing computing architecture 100 (or alternately referred to herein as an intelligence processing integrated circuit 100) for processing computationally-intensive programs and/or applications (e.g., machine learning applications, neural networks, etc.) includes an intelligence processing array 105 that includes a plurality of intelligence (computing) processing (tiles) units 110, a network on chip system 120 that includes a plurality of network-on-chip routers 125, an integrated circuit controller circuit 130, tile sector controller circuit 140, and a serial connection bus 150. Preferably, each of the plurality of intelligence processing units no includes a matrix multiply accelerator 111 (may also be referred to herein as an accelerator circuit), a computer processing circuit (e.g., a microprocessor, a nano-processor, or the like) 112, a flow scoreboard (token-based governance) module 114, a single instruction multiple data (SIMD) unit 116 (e.g., streaming arithmetic logic unit or the like), and a local buffer (e.g., static random access memory (SRAM) or the like) 118. In some embodiments, a local data buffer 118 may be implemented by an SRAM controller that may include, at least, a SRAM storage or circuit, one or more data transfer engines or circuits (e.g., a DMA controller) that may be used to move data to and/or from the SRAM and other computing resources, an arbitration scheme that selects which controller has access to the SRAM at a given time. Additionally, in one preferred embodiment, each of 130, 140, and 150 may include a computer processing circuit 112, a flow scoreboard module 114, a SIMD 116, and a local data buffer 118. In one or more embodiments, the local data buffer 118 may sometimes be referred to herein as an on-tile memory or on-tile buffer indicating that the local data buffer 118 may be arranged within an intelligence processing tile 110 and in direct communication with various or one or more circuits, components, and/or modules within the intelligence processing tile 110. FIG. 1A includes a further detailed embodiment of the intelligence processing computing architecture 100 and includes additional peripheral interconnects for interfacing with the intelligence processing array 105. For instance, test structures, monitors, analog probes, and/or any suitable peripheral device may be connected along or arranged along the periphery of the intelligence processing array 105 of the intelligence computing architecture 100.

While in one or more preferred embodiments an intelligence processing unit 110 may include a matrix multiply accelerator 111, a computer processing circuit 112, a flow scoreboard module 114, a SIMD unit 116, and a local buffer 118, it shall be noted that an intelligence processing unit 110 may include any suitable combination of circuits and modules and therefore, may exclude one or more of the aforementioned circuits and modules and/or may include any combination of the aforementioned circuits and modules without meaningfully departing from the scope of the inventions described in the present application. For instance, in some embodiments, an intelligence processing unit 110 may include or consist of a flow scoreboard module 114 and a local buffer 118 (SRAM) without computational circuitry or the like (e.g., computer processing circuit 112). In another example, an intelligence processing unit 110 may include or consist of a flow scoreboard module 114, a local buffer 118 (SRAM), and an off-chip interface (e.g., USB, PCIe, HDMI, MIPI-CSI, I2C, ethernet, Bluetooth, and/or any suitable off-chip interface component).

Additionally, or alternatively, while processing within the architecture 100 may include analog processing components or the like, it shall be noted that the embodiments of the architecture 100 may also enable digital processing with any suitable circuitry including, but not limited to, embedded Field Programmable Gate Arrays (eFPGA), Systolic arrays, floating point units, and/or the like.

The intelligence processing array 105 (intelligence accelerator) preferably includes the plurality of distinct intelligence processing units 110 that may function to work in cooperation to execute a computationally-intensive application or the like. In some embodiments, the intelligence processing array 105 may function to define one or more intelligence processing pipelines that enables a processing of raw input data and/or data from an upstream device or process to a final output state. In such embodiment, each stage (e.g., by one or more disparate intelligence processing units 110 or the like) of the intelligence processing pipeline may be defined by a disparate intelligence processing unit no that may be specifically programmed to execute a fraction of an application or program. Each of the disparate intelligence processing units no of the intelligence processing array 105 preferably functions to operate or compute independently of other or heterogeneous intelligence processing units 110 within the intelligence processing array 105. Accordingly, because each stage of an intelligence processing pipeline may be configured with its own processing section (e.g., intelligence processing unit 110), each intelligence processing pipeline may function to processing input data independently along each stage within the pipeline thereby enabling considerable efficiencies in processing input. That is, asynchronous processing of data or raw input data may be achieved based on the independent processing and/or computations of respective intelligence processing units no.

Additionally, or alternatively, each of the one or more intelligence processing pipelines defined within the intelligence processing array 105 may be flexibly configured to enable the execution of disparate (non-dependent) applications or programs within the single array 105 or flexibly configured to enable the execution of disparate sections of a single application or a single program along various intelligence processing units no within the array 105. For instance, a first neural network application may be programmed along a first section of the intelligence processing array 105 that includes a first collection of intelligence processing units 110 and a second neural network application may be programmed along a second section of the intelligence processing array 105 that includes a second disparate collection of intelligence processing units no. In a second example, a single computationally-intensive application (e.g., a neural network or the like) may be partitioned into sub-applications (or programs) and each section programmed to a different intelligence processing unit 110 within an array 105. Additionally, or alternatively, in this second example, multiple sections of an application or multiple sub-applications may be programmed to a same intelligence processing unit no. In yet another example, a plurality of intelligence processing units no may be conglomerated to perform one or more sub-sections of a single application or a single program. That is, individual intelligence processing units 110 may be used to implement only a section of an application or a program and thus, the entirety of the application or the program is handled by a plurality of intelligence processing units 110 that each process only a section of the overall application or program. It shall be noted that the integrated circuit array 105 and/or each intelligence processing units 100 may function to compute the multiple distinct applications and/or the multiple distinct partitions of a single application or single program in parallel (i.e., at the same time), contemporaneously (i.e., processing within a common time period, nearly the same time, etc.), or synchronously (i.e., processing independently of other processes and/or processing units 110). Additionally, it shall be noted that any suitable and/or type of application or program may be partitioned along the intelligence processing array 105 including applications and/or programs that may be partitioned into multiple operational stages that may have dependencies that can be represented as tokens.

The plurality of intelligence processing (tiles) units 110 preferably function to execute an application or a program against some input data received from an upstream device or an upstream layer, such as a buffer or another intelligence processing unit 110. As mentioned above, each of the plurality of intelligence processing units 110 includes a matrix multiply accelerator (e.g., a data processing circuit, or the like) 111, a computer processing circuit (e.g., a microprocessor) 112, a flow scoreboard module 114, a SIMD unit 116, and local data buffer 118 that enables each of the plurality of intelligence processing units 110 to accomplish and/or complete a processing of input data to output data and/or execute an application or program.

Each of the plurality of intelligence processing units no preferably functions to pull and/or accesses input data from its local buffer 118, compute against the input data at the matrix multiply accelerator (MMA) in and output the results (output data) of the computation against the input data back into its local buffer 118 (or possibly to a local buffer of a downstream component or processing section).

In additionally and/or alternative embodiments of the present application, one or more distinct subsets (i.e., two or more) of the plurality of intelligence processing units no of the intelligence array may be clustered and/or conglomerated into a smaller chip (e.g., a chiplet, a system-in-a-package (SIP), 3D packaging, or the like) relative to the overall architecture 100. In such embodiments, a chiplet may be composed within the overall architecture 100 to make a full and/or independent chip. A technical benefit of such embodiments enables an enhanced level of customization of the architecture to be achieved.

In yet further embodiments, multiple integrated circuit architectures 100 may be combined and/or packaged together in a multi-chip architecture. In such embodiments, the multiple architectures 100 may be composed at a system or circuit board (panel) level. The interconnections between the multiple chips may be made using any suitable interconnect technique or interface, including PCIe or specially created bridge interfaces.

The flow scoreboard module 114 is preferably implemented by a combination of one or more computing processing circuits and flow scoreboard sub-modules. Additionally, the flow scoreboard module 114 may include a plurality of interfaces for implementing a flow control of data flowing through the one or more intelligence processing pipelines and a control of the execution of programs or the applications being handled by the one or more intelligence processing pipelines of the intelligence processing array 105.

In a preferred embodiment, the flow scoreboard module 114 may include a configuration interface, a token interface, and a notification interface. The configuration interface of the flow scoreboard 114 may be used to read and write an internal state of the flow scoreboard module 114, such as to program trigger conditions that when satisfied, in some embodiments, causes the integrated circuit via a nanoprocessor or the like to initiate a workload. The token interface of the flow scoreboard 114 may enable the intelligence integrated circuit 100 to present tokens to the flow scoreboard 114. In response to the presentation of a token via the token interface, the flow scoreboard 114 may function to update its internal state, and when necessary, update the notification interface according to token parameter values (e.g., token count values or the like, as discussed in further detail in the method 300) and a configuration of the flow scoreboard 114. The notification interface of the flow scoreboard may be implemented by the flow scoreboard module 114 to indicate to the intelligence integrated circuit 110 that one or more conditions (or prerequisites) for executing one or more programs have been satisfied. It shall be noted that the notification interface of the flow scoreboard module 114 may function to trigger any number of operations within the intelligence integrated circuit no, for example, data transfer without an explicit program execution.

It shall be noted that the configuration interface, token interface, and/or notification interface may be implemented in any suitable manner including with a combination of modules executed by one or more processing circuits, such as a microprocessor.

The network on chip system 120 that includes a plurality of network-on-chip routers 125 that function to establish a communication network between the disparate components of the intelligence integrated circuit 100. In one embodiment, each of the chip routers 125 may include dedicated input and output links for receiving and transmitting communications in the North, South, East, and West directions along the architecture 100 and specifically, within the intelligence processing array 105. In some embodiments, the network on chip system 120 enables each of the disparate intelligence processing units 110 to pass data between them, such that when one intelligence processing unit 110 completes processing input data to generate an output, the one intelligence processing unit no may function to pass the output via one or more of the network routers of the network on chip system to another intelligence processing unit and/or allow another intelligence processing unit 110 to grab the output data. As one example, the digital tokens and/or data packets may be carried along the plurality of network routers of the network on chip system 120.

The integrated circuit controller 130 preferably includes chip-level control logic, which includes boot logic, security features, clocking logic, and the like.

The tile sector controller circuit 140 preferably includes a high voltage portion or circuit of the intelligence processing computing architecture 100 that enables the reprogrammable non-volatile memories within the matrix multiply accelerator in.

The serial connection bus 150 preferably includes one of a universal serial bus (USB) port and a peripheral component interconnect express (PCI express) interface and/or any suitable high-speed. In a preferred embodiment, raw input data (e.g., raw image data or the like) and/or processed input data (e.g., from an upstream device, an upstream layer, etc.) may be received at the serial connection bus 150 and passed into the system via a primary or main buffer component. Additionally, or alternatively, input data received at the serial connection bus 150 may be passed either into a primary buffer of the intelligence processing integrated circuit 100 or directly into a local buffer 118 of an intelligence processing unit 100 via the network on chip system 120. Additionally, or alternatively, the primary buffer, which is sometimes referred to herein as a main buffer, may also be referred to as an off-tile (off-unit) memory or buffer. In particular, since the main buffer operating with the architecture 100 may be arranged remotely from and off of an intelligence processing tile 110, it may be considered an off-tile component.

Additionally, or alternatively, any suitable off-chip connection may be implemented for transmitting data into and/or out of an intelligence processing array 105 and/or throughout the intelligence integrated circuit 100. For instance, any suitable peripheral device including, but not limited to, an imaging device (e.g., a camera or image sensor), a host system (e.g., a system on chip) or workstation, another intelligence integrated circuit, and/or the like.

Accordingly, it shall be noted that any type or kind of data including tokens may be passed along the serial connection bus 150 or other suitable off-chip connection/interface. For instance, data (e.g., results of computations or other outputs, etc.) from the intelligence integrated circuit 100 may be sent out to another device or system via the serial connection bus 150 or off-chip connection. Thus, a flow control, as described in the one or more embodiments herein, may be extended from the intelligence integrated circuit 100 to other devices, when operably connected or interfacing, in some manner. That is, in some embodiments, token-based flow control may be enabled between multiple intelligence integrated circuits 100 or between a device and host.

3. A Method for Intelligently Training an Artificial Neural Network for a Mixed-Signal Integrated Circuit As shown in FIG. 2, the method 200 for dynamically improving an accuracy of an artificial neural network during a training on a training platform simulating an integrated circuit may include measuring output activations computed by one or more accelerators S210, equalizing output activations for one or more target layers of an artificial neural network S220, boosting or scaling output activations for one or more target layers of an artificial neural network S230, and encoding the one or more accelerators S250. The method 200 may optionally include validating that the computed layer-specific composite scaling factors and/or channel-specific adjustment factors increase channel quality (e.g., an effective number of bits) for one or more target layers of an artificial neural network S240.

Generally, in one or more embodiments, the method 200 may include a technique that may increase channel quality (e.g., the effective number of bits (ENOB) or signal-to-noise ratio (SNR)) for an artificial neural network (ANN) operating on a mixed-signal integrated circuit. Typically, to optimize for memory, speed, and/or power, the artificial neural networks implemented herein may be modified and/or configured for performing and/or storing computations at a bit width lower than a floating-point representation. As a result, the implemented artificial neural networks may be operating below an accuracy of an equivalent artificial neural network in a floating-point representation. Moreover, due to noise and/or other non-idealities, the integrated circuit may be performing and storing computations at a channel quality (e.g., an effective number of bits (ENOB)) lower than a maximum bit width capacity of the mixed-signal integrated circuit, which may consequently further affect the predictive accuracy of the artificial neural network.

Therefore, in one or more embodiments, increasing the channel quality (e.g., effective number of bits (ENOB)) of the artificial neural network may relate to increasing the predictive accuracy of the artificial neural network. Accordingly, using one or more steps of the method 200, the artificial neural network operating on a mixed-signal integrated circuit may reach a similar accuracy level to that of an equivalent artificial neural network operating in a floating-point representation through increasing channel quality (e.g., ENOB) during training of the artificial neural network.

3.10 Measuring Channel/Neuron Outputs Computed by an Accelerator

S210, which includes measuring channel or neuron outputs computed by one or more accelerators (e.g., an MMA), may function to measure output activations for each layer operation in an artificial neural network. An artificial neural network, as generally described herein, may include a plurality of distinct layers comprising a plurality of input and output channels therein. In one or more embodiments, each of the plurality of channels within a given layer may be referred to herein as a neuron. Therefore, in one or more preferred embodiments, measuring output activations computed by one or more matrix multiply accelerators may preferably include measuring signal outputs at various granularity levels, including at a channel-level and/or a layer-level.

In operation, while training an artificial neural network, a batch of training data (or batches of training data) may be used as input for training one or more layers and associated channels of the artificial neural network. In such instance, each of a plurality of matrix multiply accelerators (MMA) may generally be paired with a target layer of the artificial neural network and may be configured to perform layer-specific matrix-multiplication operations. This may include multiplying input vectors (e.g., input signals, input dimensions, input activations) by one of a plurality of weight matrices (of the matrix multiply accelerator) to generate output vectors (e.g., output signals, output dimensions, output activations). In other words, based on a batch of training data (i.e., input vectors), one or more layer-specific MMA's may function to compute output activations (or output vectors) for one or more layers of the artificial neural network.

Layer-Level Measurement|Layer Range Measurement

In one or more embodiments, during training of an artificial neural network, S210 may function to globally measure a signal range (or a range of output activations) for one or more layers and preferably, the signal range of each layer of the artificial neural network. It shall be noted that as layers of the artificial neural network may include a plurality of channels, S210 may function to measure (on a per-layer basis) the signal range output for all channels associated with each layer of the artificial neural network. Preferably, S210 may function to perform a layer-level measurement of the artificial neural network during a simulated training stage that, in some embodiments, may be performed by a simulation of the hardware architecture of a mixed-signal integrated circuit (e.g., system or integrated circuit 100).

In operation, as training data samples and/or training data may be used as input into the artificial neural network, S210 may measure the layer signal range (or layer bit-width range) for each layer of the artificial neural network. For example, in implementations in which S210 may measure the signal range at a layer-level, S210 may function to globally measure the signal range for an entire layer of the artificial neural network by measuring and/or overlaying the output activations (or an effective representation of the output activations) for all channels within the layer. Stated differently, S210 may measure a signal range for one or more layers of the artificial neural network by combining and/or associating all channel outputs associated with each respective layer thereby creating a compilation of the signal range outputs of each channel of the layer.

Accordingly, in one or more embodiments, by measuring all channel outputs or channel output activations associated with each layer of the artificial neural network, S210 may function to identify and/or compute a layer signal range (or a layer bit-width range) for each layer of an artificial neural network. In other words, S210 may function to measure a signal range or bit-width range for each layer of the artificial neural network by measuring the output activations (or output signals) from each layer-specific accelerator that may inform a computation and/or a selection of a composite scaling factor.

It shall be recognized that S210 may function to perform a layer-level measurement on a per-training data batch basis, such that a distinct composite scaling factor may be computed and/or selected for each respective training data batch used in training a target artificial neural network. Thus, in such embodiments, the identified composite scaling factor may be a dynamic composite scaling factor because a value of the identified composite scaling factor may be subject to change based on the distinct training data batch used as input when training the target layer.

In one implementation, S210 may function to measure a signal range for a target layer of the artificial neural network using one or more statistical calculations to determine a lower and/or an upper limit of the signal range. In some embodiments, the one or more statistical calculations may be based on identifying the ninety-fifth ($95^{th}$) percentile of the outputs of each channel of a target layer. In one or more alternative implementations, S210 may function to measure a signal range for a target layer of the artificial neural network based on identifying the three (3-) sigma output values of each channel of a target layer. It shall be noted that the output signal range for one or more layers of the artificial neural network may span across a plurality of bits (e.g., between zero (0) and eight bits (8) bits, between four (4) bits and six (6) bits, between three (3) bits and five (5) bits, etc.).

At least one technical advantage of globally measuring the signal range at a layer-level may include providing a raw, unscaled signal (or bit-width) range for the entire layer thereby enabling a technical computation of a global scaling factor that may globally scale an entire layer rather than on a scaling on a per-channel basis. Additionally, in one or more embodiments, by measuring the signal range at the layer-level, S210 may be able to identify accuracy degrading layers (e.g., bottleneck layers of the artificial neural network) that may be impeding the predictive accuracy of the neural network as one or more layers may be outputting signals (or values) below a minimum bit threshold value. Additionally, or alternatively, based on measuring the signal range at the layer-level, an average potential n-bit improvement for all layers may be computed thereby informing one or more of an automated composite scaling factor control, channel weight equalization, and a channel signal range equalization control, as described in more details below.

Channel-Level Measurement|Channel Range Measurement

Additionally, or alternatively, in one or more embodiments, S210 may function to locally measure channel output activations (e.g., channel outputs) for each channel of each layer of an artificial neural network. For instance, in one or more embodiments, S210 may locally (or individually) measure the channel signal range for each channel associated with a layer of the artificial neural network. Additionally, or alternatively, in one or more embodiments, S210 may function to measure channel weights for each channel of one or more layers of the artificial neural network.

In operation, locally (or individually) measuring each channel signal range may include individually (or independently) measuring the output scale of activated neurons or nodes of a target channel. In other words, locally measuring the outputs (or output activations) for each channel of a target layer of an artificial neural network may provide an output scale, at which, convolutional neurons or convolutional nodes may output values (e.g., a bit size of the output value) along a given signal range. Similarly, an output scale of weights for each channel may be measured and a weight channel distribution for the one or more layers of the artificial neural network may be determined based on the weight measurements.

Channel Distribution

Additionally, it shall be noted that, in one or more embodiments, as S210 may be measuring channel (output) activations or weight ranges of each channel during training of an artificial neural network, each channel associated with a layer of an artificial neural network may have a distinct channel distribution. For example, in one or more embodiments, the channel distribution may be a bit-width distribution of the bit sizes of the output vectors (e.g., output dimensions, output activations), as well as the frequency, at which, the bit-width of the output vectors may occur. Accordingly, in one or more embodiments, combining the channel distributions (for all channels of a target layer) may provide a raw (or unscaled or untuned) signal range for each layer of the artificial neural network.

Figure 3:
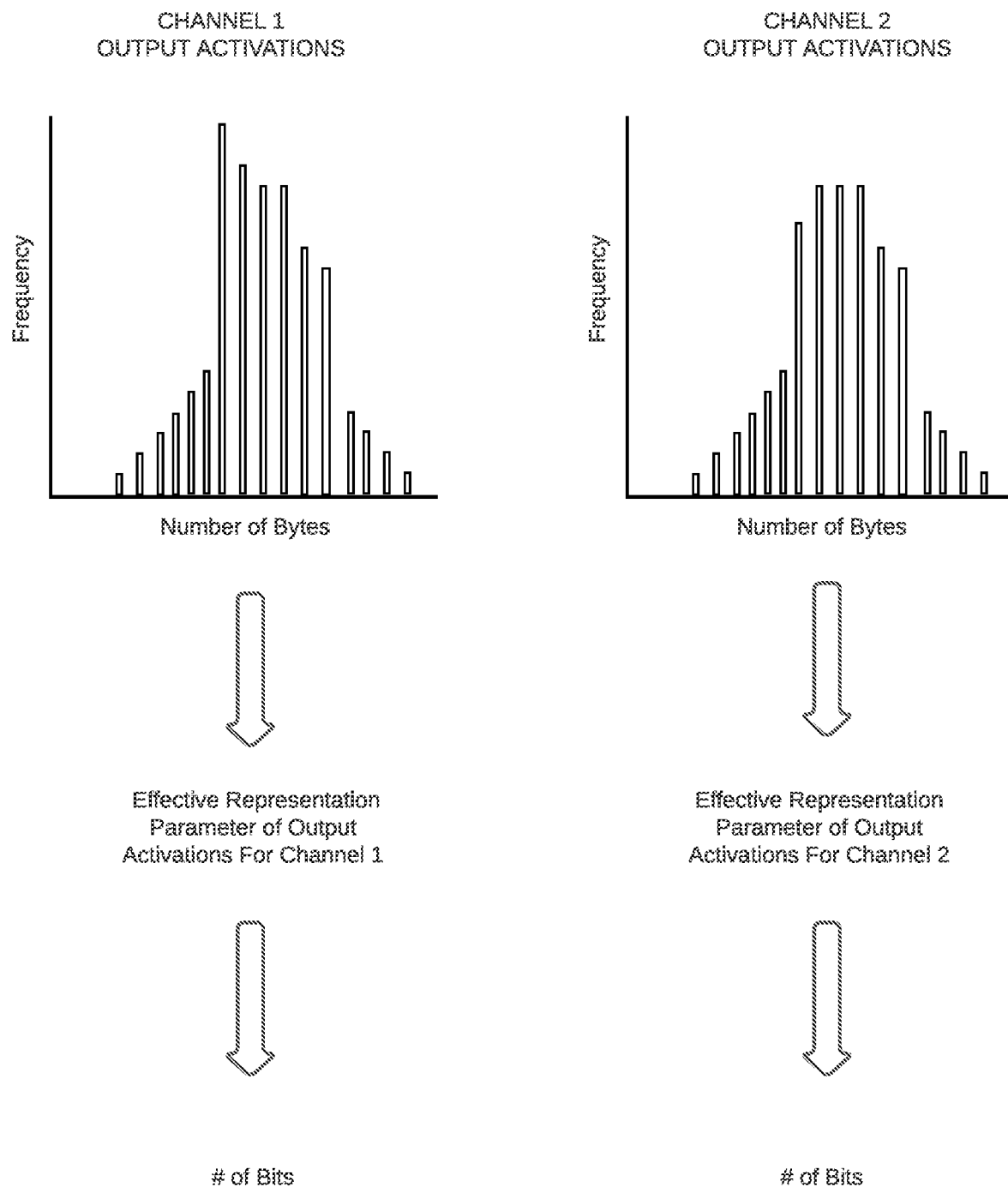
FIG. 3 illustrates example representations of channel output distributions and translating the channel output distributions into effective channel representations implementing portions of the method 200.

Additionally, it shall be noted that, in one or more embodiments, S210 may function to compute an effective channel bit width representation for each channel distribution, as shown generally by way of example in FIG. 3. For instance, in operation, S210 may function to create an effective representation of the channel distribution by applying a channel statistic that may translate the channel distribution into a single, numerical bit value. In one or more embodiments, the effective channel statistic representation (e.g., a channel distribution representation) may be a mean, a median, a predetermined percentile (e.g., $80^{th}$ percentile, $85^{th}$ percentile, $90^{th}$ percentile, $95^{th}$ percentile or based on 3-sigma and the like) of the measured channel output activations.

It shall be further noted that the signal range or bit width at a channel-level and/or a layer-level may be governed and/or entirely controlled by software. Therefore, as will be further discussed in the below steps, the method 200 may function to increase and/or equalize the signal range for one or more (and more preferably) each layer of an artificial neural network via a software-based approach, thereby increasing the channel quality (e.g., ENOB) for each layer of the artificial neural network.

3.20 Equalizing Channel Activations, Channel Weights, or Channel Magnitudes for Each Layer of the Artificial Neural Network|Channel Equalization|Weight Scaling and Equalization S220, which includes equalizing a bit range of channels or scaling channel weights on a per-layer basis during training of an artificial neural network, may function to equalize a magnitude of the channel output activations for all channels associated with a target layer of the artificial neural network. In one or more embodiments, S220 may function to selectively implement one of a channel activation output equalization and a channel weight scaling and equalization for a target channel or a target layer based on one or more selection criteria. In some embodiments, the one or more selection criteria may be based on a calculated or evaluated calculation distortion that includes calculating a distortion value or metric based on a forward pass in each channel optimization scenario including channel activation output equalization and channel weight scaling and equalization. In one embodiment, the one or more selection criteria may be based on a reference lookup, search, or heuristic that may be triggered based on programming error noise or channel activation noise thresholds (e.g., maximum expected programming noise, etc.). In one example, if a calculated noise value due to weight programming error satisfies or exceeds a noise threshold, e.g., maximum programming noise value, S220 may function to select a weight channel optimization scheme to mitigate the noise value due to weight programming error.

In one or more preferred embodiments, on a per-layer basis, S220 may function to equalize the magnitude of the channel outputs or channel weights based on the effective channel representation of each measured channel. For example, as a result of implementing a channel equalization technique, a magnitude of a first effective channel representation may be equivalent to a magnitude of a second effective channel representation.

It shall be noted that by equalizing the magnitude for all channels associated with a target layer, the channel equalization technique may aid in subsequent application of an automated composite scaling factor that may function to increase all or substantially all channels of each layer to a target signal range thereby increasing the accuracy of the artificial neural network, as all channels may be factoring equally into layer computations or layer predictions. In other words, in one or more embodiments, by equalizing the magnitude of all channel output activations for all channels (e.g., the effective channel representation of all channels) of a target layer, the channel equalization technique may prevent one or more channels from continuously (or repeatedly) having small channel outputs when compared to other channels within the same layer of the artificial neural network. Accordingly, channel equalization may equalize (or normalize) the output scale for all channels within a layer.

In one or more embodiments, to balance (or equalize) the channel magnitude (e.g., the channel signal range, the channel bit width, or the like) for each of the plurality of channels within a layer, S220 may function to implement a channel equalization module during training of the artificial neural network that may function on a per-layer basis. In one or more preferred embodiments, the channel equalization module may include one or more of setting a target equalization value (i.e., a channel equalization target), calculating a distinct signal difference from the target equalization value for each channel, adjusting one or more channels to meet the target equalization value, and optionally adjusting channels in pairs (i.e., upstream channel/downstream channel pairs) to maintain mathematical equivalence.

It shall be further noted that, in one or more embodiments, the channel equalization module may function as a feedback loop, in which, the output values computed by one or more accelerators (e.g., MMA's) may be re-used as input to compare against an equalization target. In this way, the channel equalization module may operate until a predetermined equalization threshold between the channel outputs (e.g., channel output activations) and the equalization target may be satisfied. Additionally, in some embodiments, training an artificial neural network on a training platform (e.g., an NVIDIA GPU) that may simulate an integrated circuit or a model of the computing architecture 100 may further require a filtering technique to stabilize (e.g., momentum) as the effective channel representations (e.g., channel statistics) may be re-computed with each training batch and may become unstable with the changed or modified parameters.

Setting a Target Equalization Level

In one or more embodiments, setting a target equalization level may include identifying or setting a target (or reference) value for each of a plurality of channels of a target layer based on a channel heuristic or a channel equalization parameter. It shall be noted that setting the target equalization level may include uniformly applying the target equalization level to all channels associated with a target layer of an artificial neural network. That is, in one or more embodiments, the target equalization level for a target layer may be the same (or consistent) across all channels associated with the target layer.

In first implementation, S220 may function to set a target equalization value for each of a plurality of distinct channels of a layer using one or more statistical calculations to determine a lower and/or an upper limit of the signal range. In some embodiments, the one or more statistical calculations may include identifying a channel within the layer with a highest $95^{th}$ percentile or 3-sigma top of signal range value. In such example, S220 may function to set the $95^{th}$ percentile or 3-sigma signal range value as the target equalization value for each of the plurality of remaining channels of the target layer. In one example, if a $95^{th}$ percentile top of signal range value of a channel within a layer is 130 (out of a bit range of 0-255), S220 may function to set a target equalization value of 130 for all other channels within the layer. It shall be noted that while, in some embodiments, the $95^{th}$ percentile or 3-sigma signal range value may be selected, S220 may function to select a target equalization value based on any suitable statistical technique, selection scheme or selection technique.

For instance, in a second implementation, the target equalization level for channels associated with a target layer of the artificial neural network may be identified (or computed) by averaging the effective channel representation of all channels associated with a target layer of an artificial neural network. In a third implementation, the target equalization level may be identified (or computed) by taking the minimum of all measured effective channel representations for all channels associated with a target layer of an artificial neural network. In a fourth implementation, the target equalization level may be identified (or computed) by taking the maximum of all effective channel representations for all channels associated with a target layer of an artificial neural network. In a fifth implementation, the target equalization level may be computed by taking the median effective channel representation of all channels associated with a target layer of an artificial neural network. It shall be noted that the target equalization level may vary between layers of the artificial neural network.

At least one technical benefit of identifying and/or setting a target equalization level may provide the method 200 a systematic approach for adjusting channels magnitudes (e.g., the magnitude of channel output activations) on a per-layer basis. For instance, as convolutional neurons or convolutional nodes for each channel associated with a layer of the artificial neural network may output values in various scales of magnitudes, the target equalization level may intelligently inform S220 how to adjust the effective channel representation of the output activations for each channel to attain channel equalization. In other words, based on identifying a target equalization value for all channels within a layer of an artificial neural network, S220 may function to individually adjust each channel associated with a target layer to be equivalent or substantially equivalent to the target equalization level via a channel adjustment technique.

Additionally, or alternatively, in some embodiments, S220 may function to set a target equalization value and perform a target equalization prior to a layer boosting or scaling (e.g., application of a dynamic composite scaling factor or the like), as described in S230. In such embodiments, at least one technical benefit of implementing channel equalization before layer boosting may include an ability to set a single composite scaling factor that may function to scale all or substantially all channels of a target layer to top of signal range target. That is, in some embodiments, if all channels of a layer are equalized to a set target signal range value, the difference between the set target equalization value for all channels and a target top of signal range may be expected to be the same (e.g., target top of signal range: 255−target equalization value:130=125). Since the difference from the equalization value and a target top of range value for all channels of a layer may be known, a single composite scaling factor may be computed for the layer that may function to scale all channels to the target top of range value (e.g., 255).

Channel Adjustment

Figure 4:
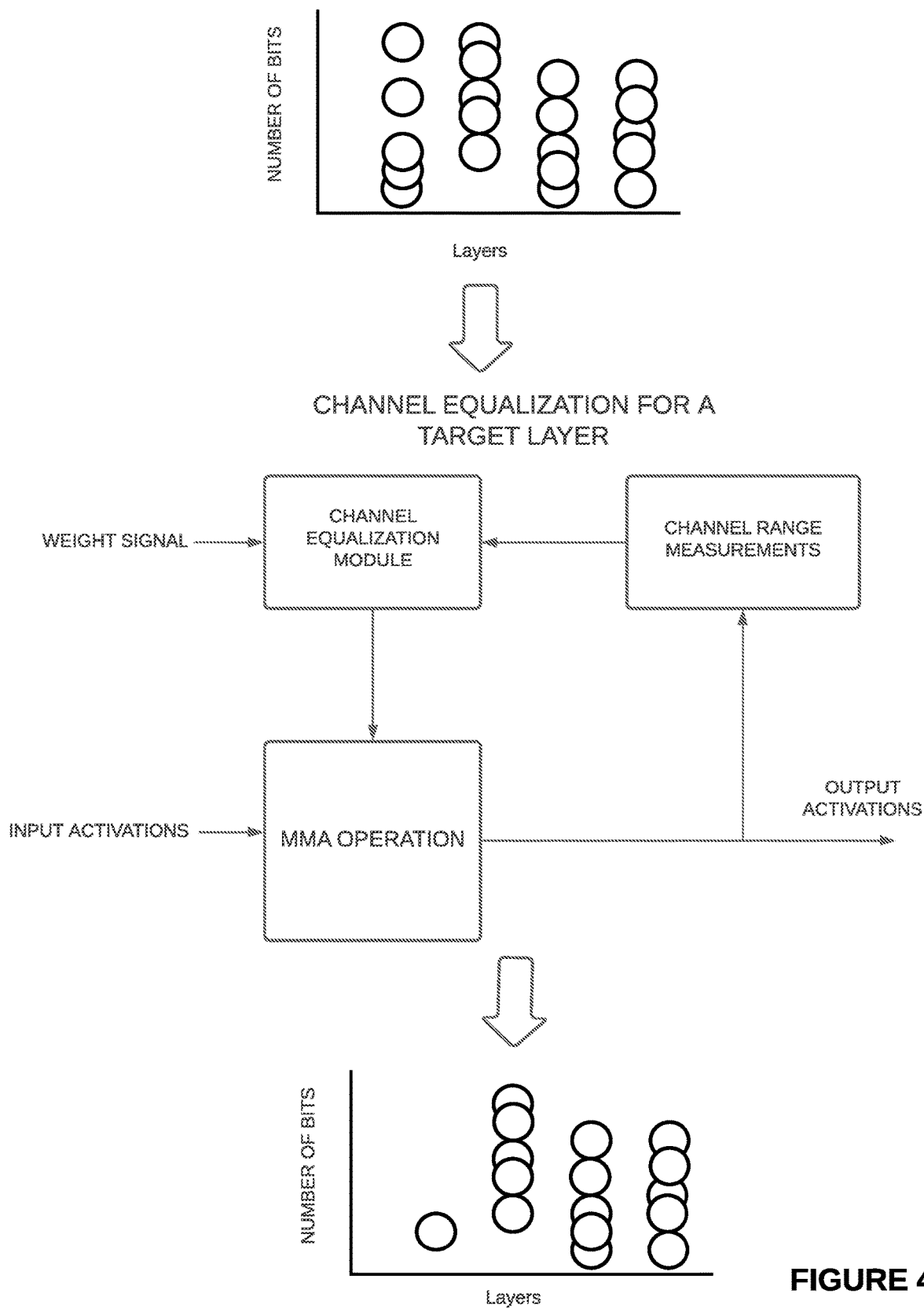
FIG. 4 illustrates an example schematic of implementing a channel equalization technique for a target layer of an artificial neural network implementing portions of the method 200.

In one or more embodiments, S220 may function to perform a channel adjustment technique to increase and/or decrease a signal range (or magnitude of the output activations) for one or more channels of a neural network layer, as shown generally by way of example in FIG. 4. For example, in one or more embodiments, in accordance with identifying and/or selecting an equalization target for each of the plurality of channels of a corresponding layer of an artificial neural network, S220 may function to adjust each channel (e.g., the effective channel representation of the outputs for each channel) to meet or substantially match (or align) with the equalization target.

In operation, S220 may compute a channel-specific adjustment factor for a target channel of an artificial neural network layer by receiving, as input, a measurement of the signal range for the target channel (as described in S210) and may further evaluate the measured signal range against the target equalization level. That is, S220 may function to calculate or compute a signal range difference by identifying a difference between the measured signal range of a channel and the target equalization level. In such embodiments, the calculated signal range difference for each channel of a target layer may inform a distinct channel equalization adjustment for each respective channel of the target layer.

For instance, consider a layer of an artificial neural network having at least a first channel and a second channel. In such example, the measured size (or measured magnitude) of the first channel may be scaled down to meet or at least substantially meet the target equalization level and the measured size (or measured magnitude) of the second channel may be scaled up to meet the target equalization level. This is, upon reaching channel equalization, all channels associated with a layer of an artificial neural network may have a substantially equivalent channel size or magnitude of channel (output) activations.

It shall be noted that S220 may be configured to adjust the size (or magnitude) of a channel during computations by the layer-specific computation via an accelerator (e.g., an MMA) by applying one or more of a channel adjustment factor, a channel scaling factor, adjusting layer bias and the like. In one or more embodiments, to adjust (or scale) a size of the channel output activations (or the effective channel representation) to meet a target equalization level, the channel equalization module may function to adjust the computations performed by an MMA by multiplying the sub-matrix (e.g., a weight matrix) of the MMA by a channel adjustment factor. It shall be further noted to decrease the size of the output activations of the first channel, the channel adjustment factor may be between zero and one, and to increase the size of the output activations of the second channel the channel adjustment factor may be greater than one. Accordingly, the adjusted MMA sub-matrix (e.g., the new or adjusted weight matrix) may be used to multiply the input vectors (or input activations) to generate new output vectors that may more closely align with the target equalization level.

Additionally, or alternatively, the adjusted (or new) output activations computed by the MMA and the channel adjustment factor may be measured according to the target equalization level to verify or validate that the adjusted (or new) effective channel representation may align or at least may be similar to the equalization target. It shall be noted that, in accordance with a determination that the adjusted (or new) output activations may not satisfy a minimum threshold between the adjusted (or new) effective channel representation and the target equalization level, one or more subsequent iterations using one or more of the aforementioned steps may be employed until the channel output activations may match the target equalization level or at least satisfies a minimum threshold criterion via the feedback loop.

Channel Pair Adjustments

Optionally, in one or more embodiments, for maintaining mathematical equivalence between input/output pairs of layers (e.g., adjacent layers, upstream/downstream layers, subsequent layers) of the neural network when modifying the layer input and layer output dimension via channel adjustments, S220 may function to implement the channel equalization module to maintain mathematical equivalence between the input/output pairs of layers in such embodiments. In other words, each input vector (e.g., each input dimension, each input activation) may be multiplied by a sub-matrix of the MMA along with an adjustment factor that may mathematically affect each output vector (e.g., each output dimension, each output activation). In some embodiments, to prevent a mathematical imbalance between the outputs of the current layer and the inputs to a downstream layer, the output vector (e.g., output dimension) may be appropriately scaled (or adjusted) to counterbalance the channel adjustment factor applied to the input vector and/or the submatrix of the MMA.

It shall be noted that in some embodiments that adjusting channels in pairs may not be required, as the artificially intelligent neural network may learn and compensate accordingly.

It shall be further noted that while the above-description includes examples and embodiments for channel activation outputs equalization and adjustments, similar processes and techniques may be applied for measuring channel weights, setting target channel weight scaling or equalization levels, making channel weight adjustments, and channel weight pair adjustments.

3.30 Boosting or Scaling Channel Output Activations

Figure 5:
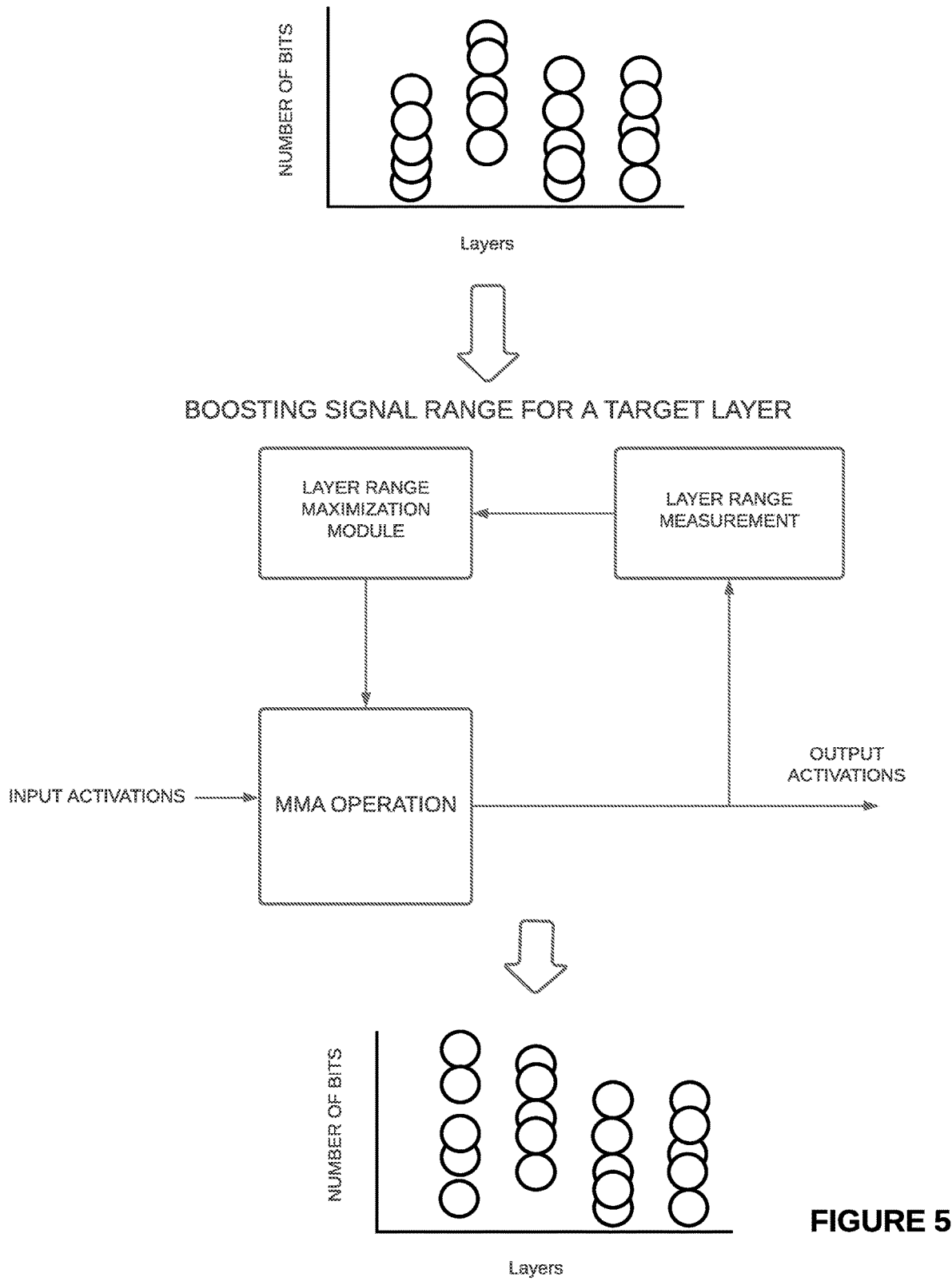
FIG. 5 illustrates an example schematic for increasing a signal range of a target layer of an artificial neural network implementing portions of the method 200.

S230, which includes boosting or scaling output activations on a per-layer basis, may function to apply a layer-based scaling factor (e.g., a layer-based composite scaling factor) that may boost or scale the signal range of the computed output activations or boost or scale the weights for all channels associated with a target layer, as shown generally by way of example in FIG. 5. For instance, in one or more preferred embodiments, a first layer scaling factor (e.g., a first composite scaling factor) may be applied to all channels associated with a first layer of an artificial neural network and a second layer scaling factor (e.g., a second composite scaling factor) may be applied to all channels associated with a second layer of the artificial neural network. In such instance, the first layer scaling factor (or the first composite scaling factor) may increase the signal range or size of the output activations of the channels of the first layer and the second layer scaling factor (or the second composite scaling factor) may increase the signal range or size of the output activations of the channels of the second layer.

In operation, S230 may function to collectively (or holistically) boost or scale the signal range of all channel output activations associated with a predetermined layer by implementing a layer range maximization module during training of the artificial neural network. In one or more embodiments, the layer range maximization module may include one or more of measuring the output signals of channels of a target layer, identifying a dominant channel, computing a composite scaling factor for the dominant channel, and scaling all channels based on the computed composite scaling factor. A dominant channel, as referred to herein, preferably relates to a channel within a target layer having a highest (activation output) signal range or a signal range with the largest magnitude.

Additionally, it shall be noted that the layer range maximization module may function as a feedback loop, in which, the output values computed by an accelerator (e.g., an MMA) may be re-used as input to compare against a reference value (e.g., the maximum code value of the mixed-signal integrated circuit). In this way, the layer range maximization module may continuously function until the reference value and the output values (or effective channel representation) for the dominant channel may reach the maximum value (e.g., a code of 255) or at least within a predetermined bit threshold.

Identifying a Dominant Channel

In one or more embodiments of identifying a dominant channel, S230 may function to identify a dominant channel associated with each layer of the artificial neural network. In one or more preferred embodiments, identifying a dominant channel for a target layer of the artificial neural network may include measuring each channel within a target layer to identify a channel with the largest measured channel output activation (or the largest measured effective channel output representation) relative to other measured channels associated with the target layer. It shall be noted that for S230 to identify such channel (e.g., the dominant channel), S230 may receive as input a measurement of a signal range for each channel of target layer and identify the channel, in which, the maximum measured signal range may have occurred.

Accordingly, by S230, and more preferably the layer range maximization module identifying the dominant channel, the layer range maximization module may compute and/or identify a composite scaling factor (e.g., a layer-based scaling factor) that may maximize the signal range for the dominant channel of each layer and consequently, substantially all or all other channels of the target layer. That is, in one or more embodiments, a selection, a search, or a computation of a composite scaling factor may be informed by a value of the signal range of the dominant channel within a target layer. In some embodiments, the noise of the dominant channel may be used to gauge a relative measure of noise in all other channels associated with the target layer, in which, many of the channels may have a smaller range of output activations and/or a smaller effective output activation.

It shall be noted that, in some embodiments, a dominant channel for a given layer may have an ENOB or MI noticeably smaller (e.g., between 3-5 bits) than the maximum or largest possible bit signal range (e.g., 8 bits) of an integrated circuit. In other words, a plurality of computed output activations computed by an accelerator (or the effective channel representation) for one or more layers may be approximately fifty (50) percent below that of the maximum possible represented value (e.g., a code of 255), in some cases due to a signal-to-noise ratio (SNR) in which the output signal is small and a noise signal may compose a significant component of the SNR. Accordingly, in such instance, the impact of noise (e.g., gaussian noise, programming error, etc.) within the system may be more of a factor or influence than desired, as the signal range may be less than preferred.

Thus, in one or more embodiment, by using a layer-based scaling factor (or a composite scaling factor), the method 200 may function to increase the signal range of each layer to reduce the impact of any noise that may be introduced into the system for the dominant channel thereby improving the signal-to-noise ratio of each target layer. Additionally, in some embodiments, training an artificial neural network on a training platform (e.g., an NVIDIA GPU) that may simulate an integrated circuit or a model of the computing architecture 100 may further require a filtering technique to stabilize (e.g., momentum), as the effective channel representations (e.g., channel statistics) may be re-computed with each training batch and may become unstable with changed or modified parameters.

Computing a Composite Scaling Factor (CSF)

Figure 6:
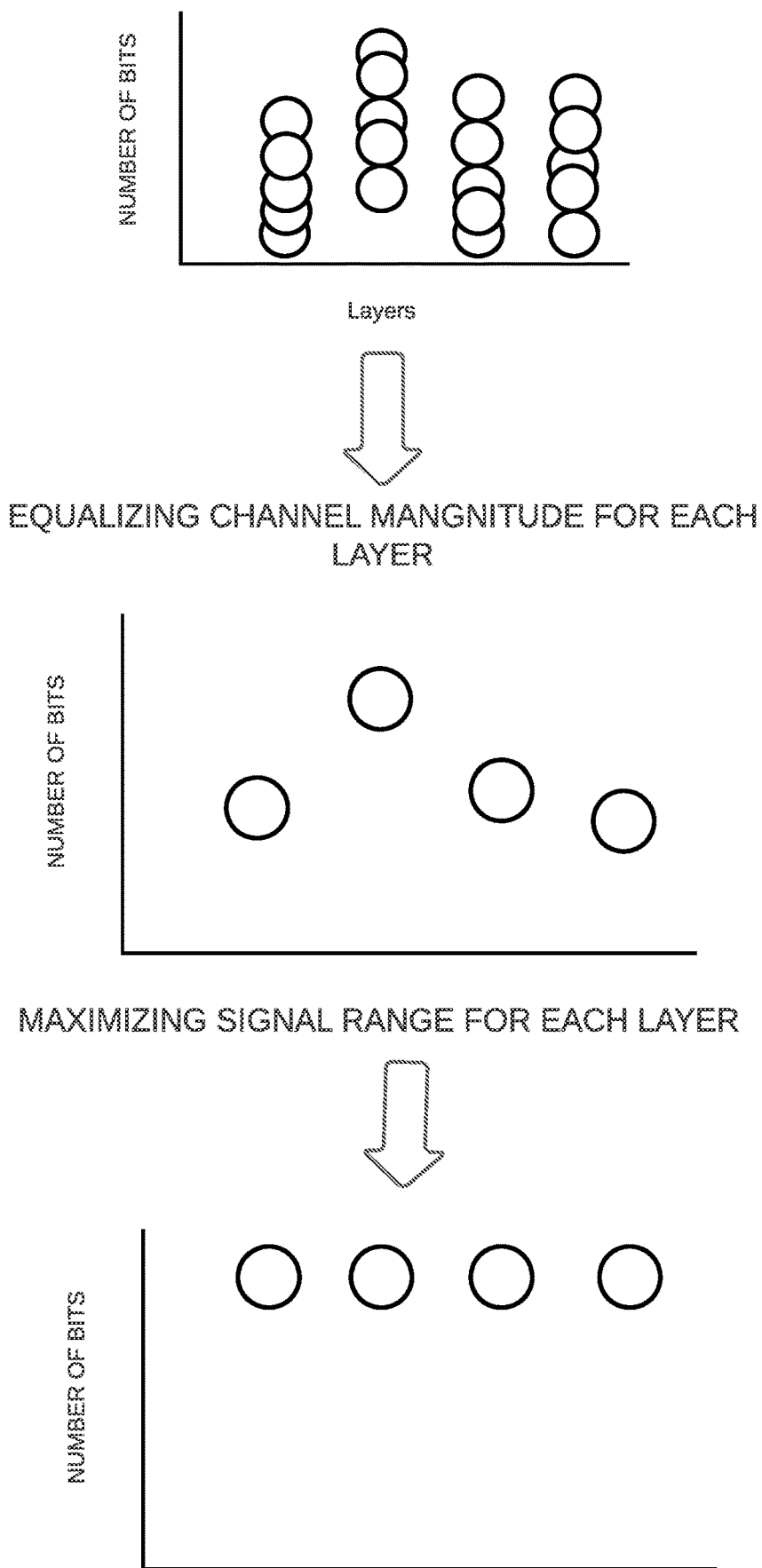
FIG. 6 illustrates an example schematic of equalizing and boosting each layer in an artificial neural network implementing portions of the method 200.

As briefly described above, in one or more embodiments, S230 may function to compute a global (or layer-level) scaling factor based upon a combination of a signal range value of the dominant channel for a given layer and a maximum possible channel output size or value (e.g., in an 8-bit system a code of 255) defined by the mixed-signal integrated circuit or the like. In one or more preferred embodiments, the layer-level scaling factor (e.g., the composite scaling factor) may be a scaling factor that may function to ensure that a target layer of an artificial neural network may be operating at a desired output scale (e.g., at least one channel for a target layer operating at the maximum code) that optimizes computation accuracy, as shown generally by way of example in FIG. 6.

It shall be noted that, in one or more embodiments, S230 may function to compute a composite scaling reference value based on the expression $$\text{Composite Scaling Reference Value} = \frac{\text{Target Code Value}}{\text{Maximum Channel Activation Output}}.$$

In such instance, the composite scaling reference value may be a proxy (or look-up) value that may be searched within a Composite Scaling Factor Reference Table or similar data structure to identify a scalar or numerical value needed to scale the dominant channel to the target code value. For example, consider a maximum channel activation output at a code of one hundred and twenty-seven (127) computed based on one of the above-mentioned channel heuristic or channel statistic) and a target code value of two-hundred and fifty-five (255).

Accordingly, in such example, a composite scaling reference value of two (2) may be numerically searched within the reference table to identify a Composite Scaling Factor that may correspond to the computed composite scaling reference value. In this case, S230 may function to identify, in the reference table, a composite scaling factor of two (2) that may scale the effective channel representation of the dominant channel to the maximum value (e.g., a code of 255 in an 8-bit system). That is, S230 may use a look-up (or proxy value) to efficiently search and/or identify a composite (or global) scaling factor within the look-up table that may maximize the output activations for the dominant channel to the upper bit limit of the mixed-signal integrated circuit for maximum numeric precision.

Additionally, in some embodiments, the composite scaling factor (e.g., the layer-level scaling factor) may be a multi-variable expression where each component scaling factor may be mapped to how the system may be controlled or configured, which may include programming a full scale range, a digital scale range, a digital scaling factor, an inference full scale range, and/or the like. It shall be noted that the composite scaling factor may not be limited by the above-mentioned expression, but rather may be any numerical expression and/or numerical value.

Accordingly, in embodiments in which the composite scaling factor may be a multiple variable expression, S230 may function to intelligently identify and/or select corresponding variable values to generate the target scaling value. That is, in one or more embodiments, based on a computed (or identified) composite scaling factor (e.g., 16, 8, 4, 2, 1, ½, ¼, etc.), S230 may intelligently identify values for each of the plurality of scaling factors to arrive at the target computed composite scaling factor. For instance, in one or more embodiments, S230 may function to reference the Composite Scaling Factor Reference Table, however, in alternative embodiments, S230 may function to automatically compute the values for the plurality of scaling factors to intelligently control hardware and software controls to achieve the preferred (or desired) scaling effect and performance.

Scaling All Channels Based on the Composite Scaling Factor

In one or more embodiments, based on computing the composite scaling factor for the dominant channel, S230 may function to apply the composite scaling factor to all channels within the target layer to increase an average or mean of the signal range for the target layer. It shall be noted that in one or more embodiments, applying the composite scaling factor to each channel within a target layer may increase the channel output activations (e.g., channel outputs) for each channel as the composite scaling factor was derived, in part, from the dominant (or maximum) channel of the target layer. It shall be noted that the composite scaling factor may be applied during computations performed by an accelerator (e.g., an MMA, a layer-specific MMA, etc.).

At least one technical advantage of scaling all channels based on a composite scaling factor may ensure that each layer of the artificial neural network may be operating at a substantially or full bit range. Therefore, in some embodiments, as the signal range for each channel may be increased (or operating at the correct bit scale) based on an application of a computed composite scaling factor, a value of a signal-to-noise ratio for a given integrated circuit may be improved as a result of an increasing signal ratio and a non-increasing noise ratio.

Additionally, or alternatively, the method 200 may include multi-stage scaling for signal-to-noise ratio (SNR) for a multi-stage analog computation. In such embodiments, if an analog computation of the accelerator includes multiple stages, the method 200 may function to implement the SNR improvement techniques described herein in multiple SNR stages matching the multiple analog compute stages of the analog computation. In such embodiments, the method 200 may function to distinctly and/or independently implement each of the multiple SNR stages to optimize over an objective of its respective analog compute stage.

3.40 Validating the Computed Composite Scaling Factor and/or the Channel Adjustment Factor on Test Data Optionally, S240, which includes validating the computed composite scaling factors and/or the computed channel adjustment factors on a test data set, may function to evaluate the effectiveness of one or more of the composite scaling factors or the channel adjustment factors computed during training of the artificial neural network. It shall be noted that, in one or more embodiments, the test data set may be a data set held back from a training corpus that may not have been previously seen by the artificial neural network during training.

In one or more embodiments, the test data set may be used as input to the artificial neural network and as the test input data may be processed through the various layers of the artificial neural network, the one or more MMAs may simultaneously be performing computations. The computations performed by the one or more MMA's may also be scaled or adjusted by a layer-specific composite scaling factor and/or a channel-specific adjustment factor. Accordingly, in some embodiments, S240 may function to access and/or evaluate the computations (e.g., output activations) of the one or more accelerators to determine one or more performance metrics including one or more of accuracy of one or more inferences of the integrated circuit, a signal-to-noise ratio of each of the one or more MMA's, and/or the like. In other words, in some embodiments, validating the layer-specific composite scaling factors and/or the channel-specific scaling factor may include verifying that one or more layers of the artificial neural network may be operating at an increased ENOB or MI range or level than before training.

It shall be noted that, in accordance with a determination that the signal range satisfies a signal range threshold, the method 200 may function to encode one or more accelerators (e.g., MMA's). Alternatively, in one or more alternative embodiments, in accordance with a determination that the signal range fails to satisfy the signal range threshold, the method 200 may function to re-train one or more layers of the artificial neural network to adjust or modify the layer-specific composite scaling factors and/or channel-specific scaling factors.

3.50 Encoding One or More Matrix Multiply Accelerators

S250, which includes encoding one or more accelerators, may function to encode one or more target accelerators with one or more trained composite scaling factors and/or one or more trained channel adjustment factors. In one or more embodiments, the identified composite scaling factor and/or the identified channel equalization factors for a target layer be passed from a training simulation stage to a non-simulated training stage. In such embodiments, a batch of training data that may have been used, as input, in the simulated training stage to determine the composite scaling factor and the channel equalization factors may be passed, as input, into the non-simulated training stage of an artificial neural network together with the identified composite scaling factor and the channel equalization factors.

In one example, a first composite scaling factor computed for a first layer of the artificial neural network may be used to encode a first MMA and a second composite scaling factor computed for a second layer of the artificial neural network may be used to encode a second MMA. In operation, S250 may function to encode one or more accelerators (e.g., MMA's) with the one or more of the learned (e.g., computed or trained) channel adjustment factors or the one or more learned composite scaling factors of S220 and S230, respectively. In one or more embodiments, an encoding may be a dynamic encoding in which the encoding may be determined on a per-training data batch basis. In some embodiments, the encoding or dynamic encoding may function to define training settings for one or more hardware components of the target processing circuitry (e.g., an MMA or similar accelerator).

For instance, in a first embodiment, S250 may function to encode each layer-specific MMA with a composite scaling factor configured for each layer of the artificial neural network. That is, S250 may function to set a static scaling factor for each MMA using a composite scaling factor derived for each layer of the artificial neural network. It shall be noted that in one or more embodiments encoding or setting the composite scaling factor may adjust how the MMA operates on the hardware (e.g., the mixed-signal integrated circuit).

Similarly, to the first implementation, in a second implementation, S250 may function to encode one or more circuits and/or one or more MMAs of the mixed-signal integrated circuit with the computed channel adjustment factor of S220. In either implementation (e.g., the first implementation or the second implementation), after training the artificial neural network on the mixed-signal integrated circuit, S250 may function to encode one or more target MMAs with the appropriate composite scaling factor and/or the channel adjustment factor computed during training.

3.55 Digital Scaling Factor

S255, which includes digitally scaling one or more digital outputs, may function to compute a digital scaling factor and apply the digital scaling factor to accumulated outputs of an analog-to-digital converter (ADC) of a mixed-signal integrated circuit.

In one or more embodiments, the method 200 may function to perform a plurality of distinct dot products in the analog domain during a training of an artificial neural network. As described herein, to improve an inferential accuracy of the artificial neural network, the method 200 identifies an optimal composite scaling factor that may be applied to a dot product computation in the analog domain to support an increase in the effective number of bits in the analog output thereby improving the inferential accuracy of the artificial neural network.

Additionally, or alternatively, the analog dot product outputs having an improved effective number of bits may be fed (serially) into an ADC that may function to serially convert the analog dot product outputs to values in the digital domain and further, serially accumulate the digital values over multiple cycles. In one or more embodiments, S255 may function to apply a digital scaling factor to the accumulated digital output from the ADC to further recover or extend the bits of precision of the final digital output.

In one implementation, identifying or computing a digital scaling factor for the digital output of the ADC includes performing one or more statistical calculations to determine an upper and/or a lower limit of the digital output range of an artificial neural network (ANN) layer. In some embodiments, the one or more statistical calculations may include one or more of a 3-sigma calculation, identifying the ninety-fifth ($95^{th}$) percentile of the outputs of the ANN layer, and/or any suitable statistical technique to identify a statistical upper limit of the digital output range of the ANN layer.

Accordingly, based on identifying a statistical upper limit of the digital output range derived for the ANN layer, S255 may function to compute a digital scaling factor that may function to increase the upper limit of the digital output range of the ANN layer to a statistically maximum digital output range for the ANN layer. In one or more embodiments, computing the digital scaling factor may include identifying a signal range difference between the statistically maximum digital output range and the upper limit of the digital output range of the ANN layer and computing digital scaling multiplier informed by the signal range difference that, when applied or executed against the digital output of the ADC, increases an overall digital output range of the ANN layer.

4. Computer-Implemented Method and Computer Program Product

The systems and methods of the preferred embodiments and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device.

The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A method for mitigating distortion in an execution of analog neural network on an analog accelerator, the method comprising:
   computing an unscaled analog output vector for each of a plurality of analog neural network layers of an artificial neural network based on an analog matrix multiply between a raw analog input vector and a raw analog weight matrix associated with each of the plurality of analog neural network layers of the artificial neural network;
   computing a plurality of statistical measurements of the unscaled analog output vector associated with each of the plurality of analog neural network layers;
   selecting a plurality of analog distortion-mitigating control parameters for each of the plurality of analog neural network layers for mitigating likely analog distortions of one or more analog accelerators based on the plurality of statistical measurements of the unscaled analog output vector;
   encoding one or more processors of an analog simulator with the selection of the plurality of analog distortion-mitigating control parameters for each of the plurality of analog neural network layers, wherein the analog simulator simulates an operation of the one or more analog accelerators;
   executing, by the analog simulator, a simulated training of the artificial neural network based on the encoding of the selection of the plurality of analog distortion-mitigating control parameters;
   computing one or more efficacy metrics of the artificial neural network based on simulated analog vector outputs of the analog simulator; and
   validating the artificial neural network or re-training the analog-artificial neural network based on whether the one or more efficacy metrics satisfy at least an inferential accuracy value.

2. The method according to claim 1, wherein computing the plurality of statistical measurements of the unscaled analog output vector includes:
   measuring N-bit activation output signal ranges of each of the plurality of analog neural network layers,
   identifying an N-bit activation output signal range having a highest upper signal value for each of the plurality of analog neural network layers.

3. The method according to claim 2, wherein selecting the plurality of analog distortion-mitigating control parameters includes identifying a composite scaling factor for each of the plurality of analog neural network layers based on the identified N-bit activation output signal range having the highest upper signal value for each respective analog neural network layer of the plurality of analog neural network layers.

4. The method according to claim 3, wherein
   the composite scaling factor relates to automated control that, when used to configure the analog simulator, increases one or more N-bit activation output signal ranges of a target analog neural network layer to a statistically maximum N-bit activation output signal range.

5. The method according to claim 2, wherein selecting the plurality of analog distortion-mitigating control parameters includes identifying a composite scaling factor for each of the plurality of analog neural network layers including:
   deriving a composite scaling factor search value for each of the plurality of analog neural network layers based on the N-bit activation output signal range having the highest upper signal value for each of the plurality of analog neural network layers,
   performing a search of a plurality of distinct scaling factor parameters using the composite scaling factor search value, and
   defining the composite scaling factor based on the plurality of distinct scaling factor parameters.

6. The method according to claim 1, wherein
   the analog simulator includes a model of a hardware architecture of an analog accelerator circuitry of a mixed-signal integrated circuit.

7. The method according to claim 1, wherein the statistical measurements of the unscaled analog output vector further include:
   identifying a median signal value of the N-bit activation output signal for each layer; and
   computing a variance of the N-bit activation output signal for each layer based on the medial signal value; and
   assessing a stability of the artificial neural network during the simulated training.

8. The method according to claim 1, wherein the one or more efficacy metrics include:
   evaluating a signal-to-noise ratio across one or more of the plurality of analog neural network layers to determine an impact of the distortion-mitigating control parameters.

9. The method according to claim 1, wherein the analog distortion-mitigating control parameters include:
   a set of noise reduction technique applied during an operation of the analog matrix multiply thereby enhancing the inferential accuracy value of the analog neural network.

10. The method according to claim 3, wherein the composite scaling factor is dynamically adjusted during the simulated training based on real-time monitoring of the one or more efficacy metrics of the artificial neural network.

11. The method according to claim 5, wherein the plurality of distinct scaling factor parameters are selected based on a hierarchical search strategy that prioritizes scaling factors with a greatest impact value for improving an inferential accuracy of the artificial neural network.

12. The method according to claim 6, wherein the analog simulator includes a model of parasitic components of the analog accelerator circuitry.

13. The method according to claim 6, wherein the model of the hardware architecture of the analog accelerator circuitry includes a simulation of non-idealities in an analog-to-digital conversion process.

14. A method for enhancing inferential accuracy of an artificial neural network during training on a mixed-signal integrated circuit, the method comprising:
   identifying a dynamic composite scaling factor for each of a plurality of distinct computational layers of a target artificial neural network, wherein identifying the dynamic composite scaling factor includes:
- (i) executing a pre-training matrix multiply accumulate (MMA) on an analog accelerator for a target computational layer of the plurality of distinct computational layers based on an input of a batch of training data;
- (ii) measuring an unscaled N-bit activation output signal range of the target computational layer based on the input of the batch of training data;
- (iii) calculating a dynamic composite scaling factor for the target computational layer based on the unscaled N-bit activation output signal range of the target computation layer; and
- (iv) selecting a distinct set of scaling factors for the target computation layer based on the calculated dynamic composite scaling factor for the target computational layer;

during a training of the target artificial neural network:
- (a) applying the batch of training data as training input; and
- (b) individually applying, during an MMA operation on the analog accelerator, the selected distinct set of scaling factors of the calculated dynamic composite scaling factor to each of the plurality of distinct computational layers of the target artificial neural network.

15. The method according to claim 14, wherein the dynamic composite scaling factor is fine-tuned based on one or more of environmental variables, supply voltage variations, and inherent noise characteristics of analog accelerator circuitry of the mixed-signal integrated circuit.

16. The method according to claim 14, further comprising:
generating a feedback loop that updates the dynamic composite scaling factor for each of the plurality of distinct computational layers based on performance metrics derived from simulated operations the analog accelerator.

17. A method comprising:
computing an unscaled analog output vector for each of a plurality of analog neural network layers of an artificial neural network based on a matrix multiply between an analog input vector and an analog weight matrix associated with each of the plurality of analog neural network layers of the artificial neural network;

computing a plurality of statistical measurements of the unscaled analog output vector associated with each of the plurality of analog neural network layers;

selecting a plurality of analog distortion-mitigating control parameters for each of the plurality of analog neural network layers for mitigating likely analog distortions of one or more analog accelerators based on the plurality of statistical measurements of the unscaled analog output vector;

encoding one or more processors of an analog simulator with the selection of the plurality of analog distortion-mitigating control parameters for each of the plurality of analog neural network layers, wherein the analog simulator simulates an operation of the one or more analog accelerators;

executing, by the analog simulator, a simulated training of the artificial neural network based on the encoding of the selection of the plurality of analog distortion-mitigating control parameters;

computing one or more efficacy metrics of the artificial neural network based on simulated analog vector outputs of the analog simulator; and validating the artificial neural network or re-training the artificial neural network based on whether the one or more efficacy metrics satisfy at least an inferential accuracy value.

* * * * *